(12) United States Patent
Evans

(10) Patent No.: US 6,600,321 B2
(45) Date of Patent: Jul. 29, 2003

(54) APPARATUS AND METHOD FOR WELLBORE RESISTIVITY DETERMINATION AND IMAGING USING CAPACITIVE COUPLING

(75) Inventor: Martin Townley Evans, Norwich (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/090,374

(22) Filed: Mar. 4, 2002

(65) Prior Publication Data

US 2002/0166699 A1 Nov. 14, 2002

Related U.S. Application Data

(63) Continuation-in-part of application No. 09/836,980, filed on Apr. 18, 2001.
(51) Int. Cl.[7] .............................. G01V 3/20; G01V 3/24
(52) U.S. Cl. ......................................... 324/369; 175/50
(58) Field of Search ................................ 324/356, 369; 175/40, 50; 166/250.01

(56) References Cited

U.S. PATENT DOCUMENTS

| 3,365,658 | A | 1/1968 | Birdwell ........................ 324/10 |
| 3,953,796 | A | 4/1976 | Keller ....................... 324/158 R |
| 4,122,387 | A | 10/1978 | Ajam et al. ..................... 324/10 |
| 4,468,623 | A | 8/1984 | Gianzero et al. ............ 324/367 |
| 5,502,686 | A | 3/1996 | Dory et al. ..................... 367/34 |
| 6,173,793 | B1 | 1/2001 | Thompson et al. ........... 175/45 |
| 6,247,542 | B1 | 6/2001 | Kruspe et al. ................. 175/40 |

*Primary Examiner*—Walter E. Snow
(74) *Attorney, Agent, or Firm*—Madan, Mossman & Sriram, P.C.

(57) ABSTRACT

An apparatus for obtaining resistivity images of a borehole having an oil-based mud includes a rotating measure electrode on a measurement-while-drilling apparatus. A modulated measure current is capacitively coupled to the formation through the nonconducting mud. The electrode may be carried on a stabilizer of the drilling assembly. An extendable arm may be used to maintain a desired distance between the electrode and the formation.

18 Claims, 6 Drawing Sheets

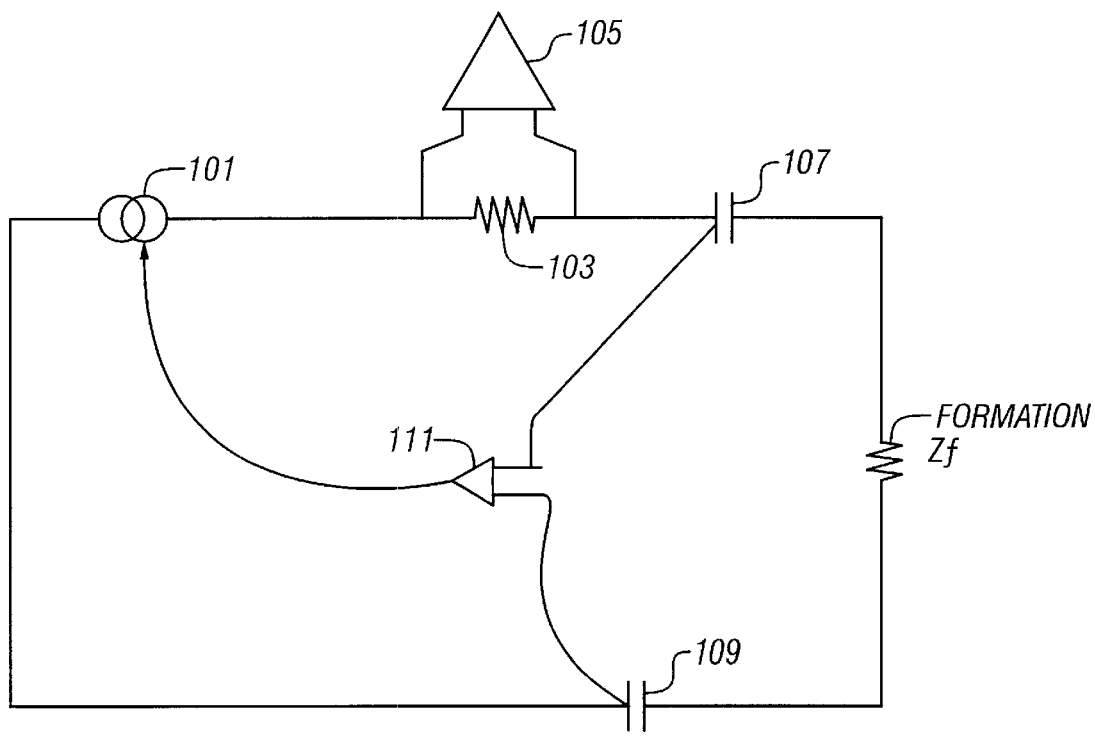
FIG. 3
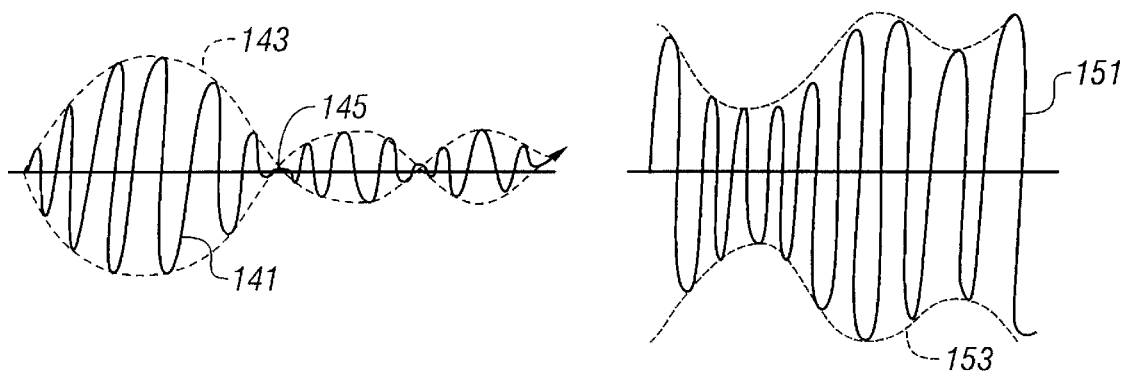
FIG. 4A  FIG. 4B

APPARATUS AND METHOD FOR WELLBORE RESISTIVITY DETERMINATION AND IMAGING USING CAPACITIVE COUPLING

CROSS REFERENCES TO RELATED APPLICATIONS

This applications is a continuation-in-part of U.S. patent application Ser. No. 09/836,980 filed on Apr. 18, 2001.

BACKGROUND OF THE INVENTION

1. Field of the Invention

This invention generally relates to explorations for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. A jam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al. U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes is irregular, resulting in inaccurate imaging of the borehole. A second drawback is the relatively shallow depth of investigation caused by the use of measure electrodes at the same potential as the pad and the resulting divergence of the measure currents.

Co-pending U.S. patent application Ser. No. 09/754,431 having the same assignee as the present application and the contents of which are incorporated herein by reference, discloses an apparatus that includes an array of measure electrodes separated from a pad or the body of the instrument by focus electrodes, the pad or body acting as the guard electrode. The focus electrode is maintained at a slightly lower potential than the pad and the measure electrode is at an intermediate potential thereto. With this arrangement, the current from the measure electrode initially diverges as it enters the formation, then converges (focuses) and then finally diverges again to define a depth of investigation. This arrangement makes it relatively insensitive to borehole rugosity.

Yet another drawback with the use of contact devices injecting electrical currents into a wellbore arises when oil-based muds are used in drilling. Oil-based muds must be used when drilling through water soluble formations: an increasing number of present day exploration prospects lie beneath salt layers. Besides reducing the electrical contact between the logging tool and the formation, invasion of porous formations by a resistive, oil-based mud greatly reduces the effectiveness of prior art resistivity imaging devices. This problem is not alleviated by the use of focusing electrodes.

It would be desirable to have an apparatus and method of determination of formation resistivity that is relatively insensitive to borehole rugosity and can be used with either water based or with oil-based muds. The present invention satisfies this need.

SUMMARY OF THE INVENTION

The present invention is a MWD apparatus conveyed in a borehole for obtaining a resistivity image of an earth formation penetrated by the borehole. The apparatus includes at least one measure electrode that injects a measure current into the formation. Due to the high frequency of the current, an electrical circuit is completed when the borehole is filled with a non-conductive fluid through a capacitive gap between the electrode and the formation. A guard potential is provided to maintain focusing of the current. The modulation of the measure current and the demodulation of the output of the current measuring circuit helps reduce the cross-talk between them. Amplitude modulation, reverse amplitude modulation, frequency modulation or phase modulation may be used.

Orientation sensors on the MWD apparatus provide measurement of the orientation of the measure electrode. A downhole processor uses measurements of the measure current and/or the voltage of the measure electrode, the orientation measurements, and depth information to provide a resistivity image of the borehole.

BRIEF DESCRIPTION OF THE FIGURES

FIG. 3 is a schematic circuit diagram showing the principles of operation of the tool.

FIGS. 4a and 4b shows a comparison between a prior art modulated signal and a reverse modulated signal according to the present invention.

DETAILED DESCRIPTION OF THE INVENTION

Figure 1:
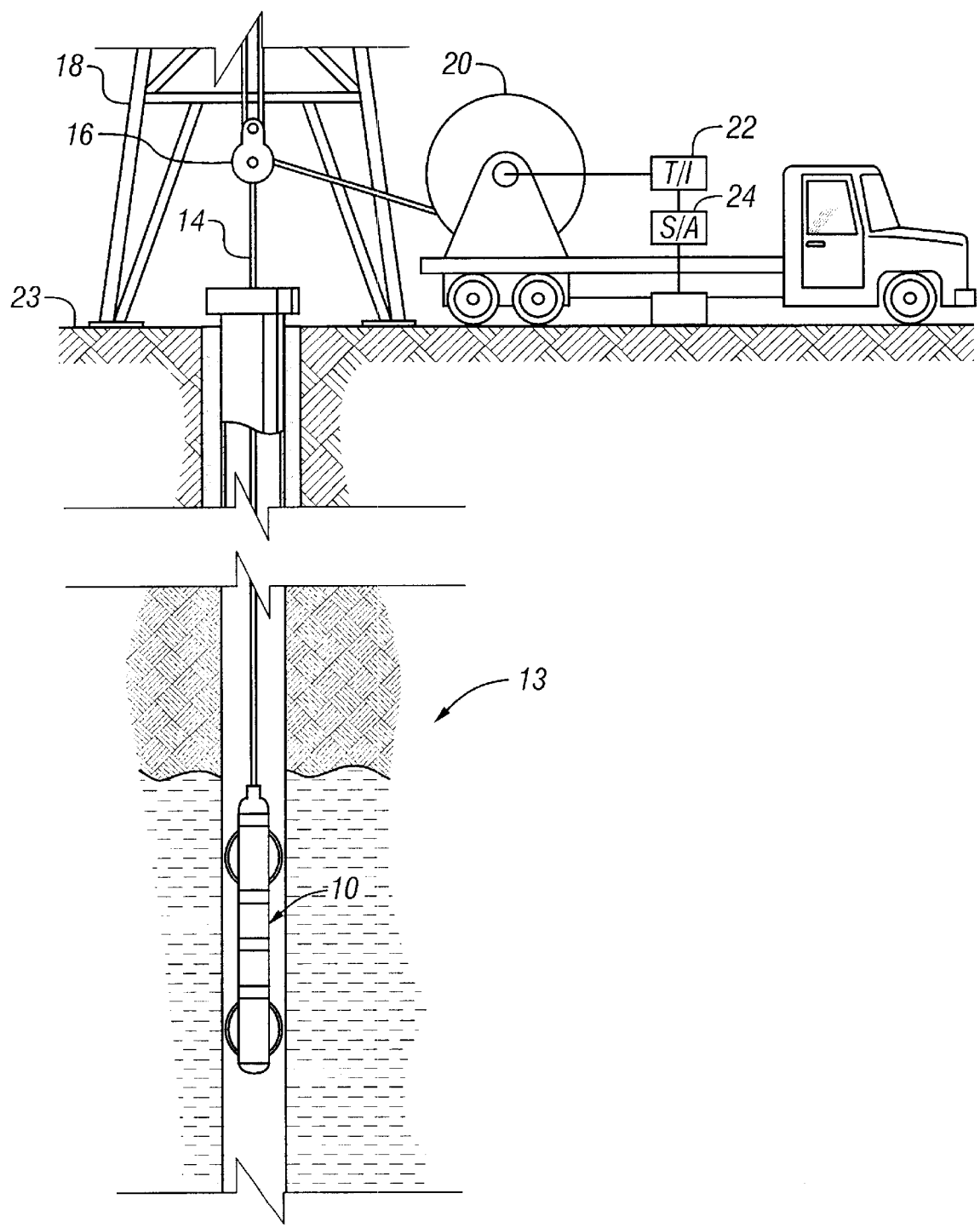
FIG. 1 shows the imaging tool of this invention suspended in a borehole.

In order to gain a proper understanding of the present invention, reference is made to FIGS. 1–5. FIG. 1 shows an imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2A:
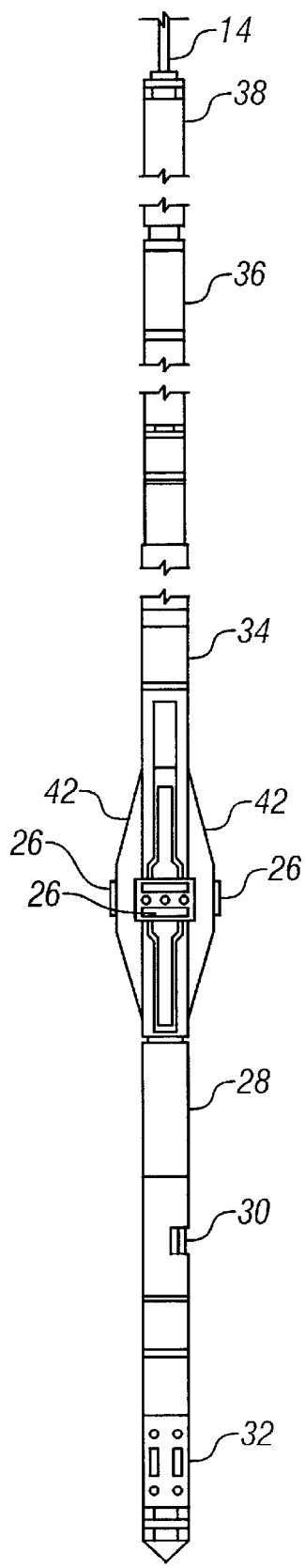
FIG. 2A is a detail view of an electrode pad.
Figure 2B:
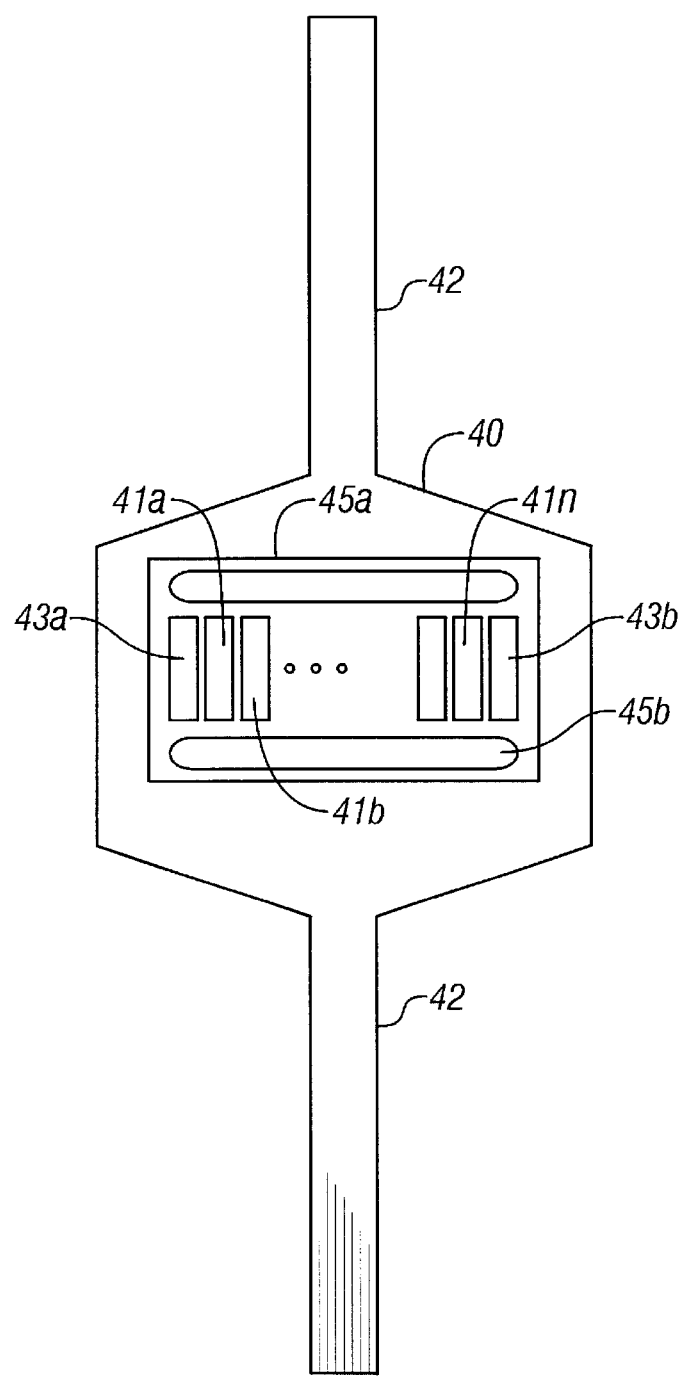
FIG. 2 is a mechanical schematic view of the imaging tool.

FIG. 2 is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Also shown in FIG. 2 are three resistivity arrays 26 (a fourth array is hidden in this view). Referring to FIGS. 2 and 2A, each array includes measure electrodes 41a, 41b, . . . 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

Figure 6:
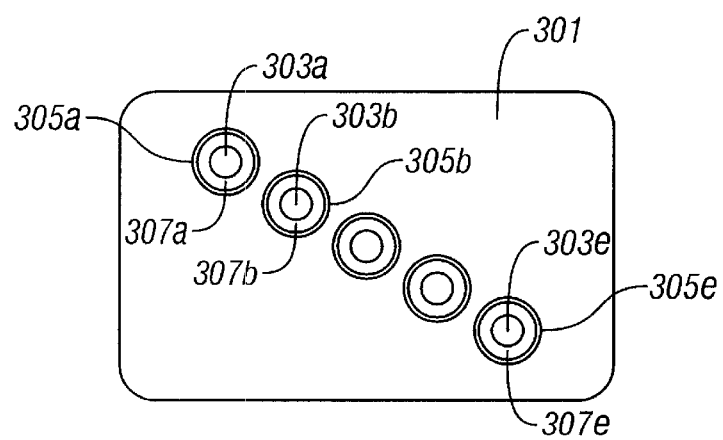
FIG. 6 illustrates an alternate embodiment of an electrode pad.

In a preferred embodiment of the invention, the measure electrodes are rectangular in shape and oriented with the long dimension of the rectangle parallel to the tool axis. Other electrode configurations are discussed below with reference to FIG. 6. For the purpose of simplifying the illustration, insulation around the measure electrodes and focusing electrodes for electrically isolating them from the body of the tool are not shown.

Other embodiments of the invention may be used in measurement-while-drilling (MWD), logging-while-drilling (LWD) or logging-while-tripping (LWT) operations. The sensor assembly may be used on a substantially non-rotating pad as taught in U.S. Pat. No. 6,173,793 to Thompson et al., having the same assignee as the present application and the contents of which are fully incorporated herein by reference. The sensor assembly of the present invention may also be used with rotating sensors as described in Thompson. These embodiments are discussed below with reference to FIGS. 7–9. The sensor assembly may also be used on a non-rotating sleeve such as that disclosed in U.S. Pat. No. 6,247,542 to Kruspe et al, the contents of which are fully incorporated here by reference.

For a 5" diameter assembly, each pad can be no more than about 4.0 inches wide. The pads are secured to extendable arms such as 42. Hydraulic or spring-loaded caliper-arm actuators (not shown) of any well-known type extend the pads and their electrodes against the borehole sidewall for resistivity measurements. In addition, the extendable caliper arms 42 provide the actual measurement of the borehole diameter as is well known in the art. Using time-division multiplexing, the voltage drop and current flow is measured between a common electrode on the tool and the respective electrodes on each array to furnish a measure of the resistivity of the sidewall (or its inverse, conductivity) as a function of azimuth.

Turning now to FIG. 3, a circuit diagram showing the principles of operation of the tool is given. A source of electrical power 101 produces an electrical current that is provided to the measure electrodes. In one embodiment of the invention, the apparatus is intended for use with oil based drilling mud and the capacitor 107 depicts the capacitive coupling between a measure electrode such as 41a in FIG. 2a and the formation 13 in FIG. 1. The electrical current flows through the formation that has an equivalent impedance of $Z_f$ and returns to the current source 101 through an equivalent capacitor 109 representing the coupling between the formation and the diffuse return electrode, typically the body of the tool. The measurement of the voltage drop across a resistor 103 is used as an indication of the current flowing to a measure electrode. Other methods for measurement of the current in the measure electrode may also be used. Such methods would be known to those versed in the art and are not discussed here. In a preferred embodiment of the invention, the value of the resistor 103 is 1 k $\Omega$. The impedance of the rest of the return path in the body of the tool can be ignored.

Still referring to FIG. 3, a voltage detector 111 measures the voltage difference between the measure electrode and the diffuse return electrode and controls the current at the current generator to maintain a constant voltage. In this case, the output of the current measuring circuit serves as a measure signal. Alternatively (not shown), the output of the current measuring circuit 105 is used to maintain a constant current and the output of the voltage detector is used as a measure signal. As still another alternative, both the voltage detected by the voltage detector 111 and the current measured by the current measuring circuit 105 are used as measure signals.

Selection of the size of the measure electrode and the operating frequency is based upon several considerations. One important consideration is that the impedance of the formation must be substantially resistive at the operating frequency so that the currents in the measure electrode are indicative of the formation resistivity and substantially unaffected by its dielectric constant. Based upon typical values of formation dielectric constant such as that disclosed in U.S. Pat. No. 5,811,973 issued to Meyer et al, the operating frequency should be less than 4 MHz. As mentioned above, a preferred embodiment of the present invention uses a measuring current at a frequency of 1 MHz. A second consideration is that the impedance (i.e., resistance) of the formation be greater than the impedance of the rest of the circuit of FIG. 3. Another consideration is the desired resolution of the tool. A reasonable resolution for a useful imaging tool is approximately 3 mm. in the horizontal and vertical directions.

The impedance of the equivalent capacitance 109 and the body of the tool may be ignored at 1 MHz since the equivalent capacitor has an enormous area comparable to the size of the tool. The capacitance of 107 is a function of the dielectric constant of the borehole fluid, the area of the electrode, and the stand-off between the electrode and the borehole wall. Formation resistivities encountered in practice may range between 0.2 $\Omega$-m and 20,000 $\Omega$-m. As noted above and discussed below, the present invention makes use of focusing electrodes so that, in general, the effective dimensions of the formation that are sampled by an electrode are less than the actual physical size of the electrodes. Based upon these considerations, and the requirement that a plurality of electrodes must fit on a single pad, in a preferred embodiment of the invention as shown in FIGS. 2, 2A, the individual measure electrodes 41a, 4b . . . 41n have a width of 8 mm. and a length of between 20–30 mm. This makes it possible to have eight electrodes on a single pad. The corresponding value of the capacitance 107 is then typically between 1 pF and 100 pF. At the lower value, the impedance of the capacitance 107 at 1 MHz is approximately 160 k $\Omega$ and at the higher value approximately 1.6 k $\Omega$ The principles of operation of focusing electrodes is discussed in the '431 application and are not discussed here further. In the present device, the focusing electrodes 45a, 45b are of particular importance as they perform a significant amount of focusing. Denoting by V the potential of the measure electrodes 41a, 41b . . . the electrodes 45a, 45b are maintained at a potential of V+$\delta$. The body of the pad is maintained at a voltage V+$\epsilon$,. The pad functions as a guard electrode and prevents divergence of the measure current until the current has penetrated some distance into the formation. This makes it possible to get deeper readings. A typical value of the voltage V is 5 volts while typical value of $\delta$ and $\epsilon$, are 500 $\mu$V and 100 $\mu$V, with $\epsilon$ being less than $\delta$. Since little focusing is needed in the horizontal direction, the side focusing electrodes 43a, 43b are maintained at substantially V volts. Those versed in the art would recognize that the device could also function if all the voltages were reversed, in which case, the voltages mentioned above as typical values would be magnitudes of voltages.

With the potentials of the measure electrodes, the focusing electrodes and the pads is discussed above, the current from the current source 101 in FIG. 3 will be focused down to square blocks approximately 8 mm. on the side. The operating frequency of the present device is typically 1 MHz, compared to an operating frequency of 1.1 kHz for the device of the '431 application.

Those versed in the art would recognize that a considerable amount of cross-talk would normally be generated between the current flowing to the measure electrodes from the electronics module 38 and the measure signal(s) returning from the measure electrodes carrying information about the voltages and/or currents of the electrodes. The measuring electrodes are preferably isolated from the electronics module by an isolator section such as 37 that is preferably between 2'6" and 15' long. Cross-talk between conductors (not shown) over such distances would be quite large at an operating frequency of 1 MHz would overwhelm the measure signal(s) indicative of the formation resistivity.

This problem is addressed in the present invention by modulating the current output of the generator at 1.1 kHz. The result is that the current traveling down conductors in the isolator section and into the formation is a 1 MHz current modulated at 1.1 kHz. A demodulator (not shown) is provided in the voltage measuring circuit so that the return signal to the electronics module 38 is a 1.1 kHz signal. This makes it possible to use substantially the same hardware configuration as in the device of '431 application, such device having been designed to substantially attenuate the cross-talk.

To further reduce the effects of cross-talk, instead of conventional amplitude modulation of the currents, an inverse modulation is used. Conventional amplitude modulation is given by a current i(t)

$$i(t)=\cos(\omega_m t)\cos(\omega_c t) \quad (1)$$

where $\omega_m$ is the modulating signal frequency (1.1 kHz) and $\omega_c$ is the carrier frequency (1 MHz). The inverse modulation of the present invention uses a modulation of the form $$i(t)=(1-a\cos(\omega_m t))\cos(\omega_c t) \quad (2)$$

where a is small compared to 1. The result is that the current output of the generator 101 is substantially at 1 MHz with an amplitude close to unity at all times. This makes the cross-talk substantially independent of the magnitude of the measure current. Substantially the same result may be obtained in alternate embodiments of the invention by using frequency or phase modulation of the 1 MHz carrier signal.

FIGS. 4a and 4b show a comparison between a prior art modulated signal and a reverse modulated signal according to the present invention. A carrier signal 141 having a carrier frequency has its amplitude modulated by a lower frequency modulating signal 143. As can be seen, the level of amplitude of the modulated signal goes to zero whenever the modulating signal goes to zero at times such as 145. A reverse modulated signal is shown in FIG. 4b with a carrier signal 151 and a modulating signal 153. This modulated signal always has a significant current flowing. The advantage of using such a reverse modulated signal is that the cross talk is substantially unaffected by the level of the modulating signal.

In an alternate embodiment of the invention, the measure signal(s) is sent through an optical fiber. When an optical fiber is used for the purpose, there will not be any cross talk between the current conveyed through the isolator section and the measure signal. Modulation of the current is then not necessary.

In an alternate embodiment of the invention, the principles described above are used when the measure electrodes are not part of an array of electrodes. With a single electrode, measurements indicative of the resistivity of the formation may be obtained. With a plurality of azimuthally distributed electrodes, such output measurements may be processed using prior art methods, such as those used in dipmeters, to obtain information relating to the dip of formations relative to the borehole. When combined with measurements of the borehole orientation and tool face orientation, such relative dip information may be further processed to give estimates of absolute dip of the formations.

Another embodiment of the present invention may be used with water based muds. The equivalent circuit for this embodiment is shown in FIG. 4. It is identical to FIG. 3 except that the gap between the measure electrode and the formation is a conductive gap denoted by the points 209–211 and a return gap denoted by 219–221. An additional capacitor 207 may be incorporated into the circuit. The operation of the device is substantially unchanged from that used for non-conducting muds. The conductive paths through the mud shunts any effect of the capacitance of the tool stand-off.

Such an arrangement has been used in the past with contact electrodes for resistivity measurements or resistivity imagers. The function of an internal capacitor in such prior art circuits has been solely for the purpose of blocking any extraneous currents emanating from sources external to the measure circuit from entering the amplifiers and distorting the operation of such prior art apparatus. Other methods have also been used for compensating for such extraneous currents. However, the particular embodiment utilizing an external capacitor constructed from instrument electrode plate, conductive earth formation plate and drilling mud dielectric, with high frequency, modulated measure currents such as are used in the present invention and depicted in FIG. 4 have not previously been used.

The resolution of the devices disclosed above is substantially equal to the dimensions of the focused current at a depth where the current from the measure electrode has the smallest dimensions. Those versed in the art would recognize that if lower resolution is acceptable, the focusing electrodes may be eliminated. In such a device, the beam of measure current is only guarded or constrained to flow substantially outward from the surface of the measure electrode, as in prior art non-focused conductive mud devices, by the pad (or guard electrode) being maintained at substantially the same voltage as the measure electrode.

Figure 5:
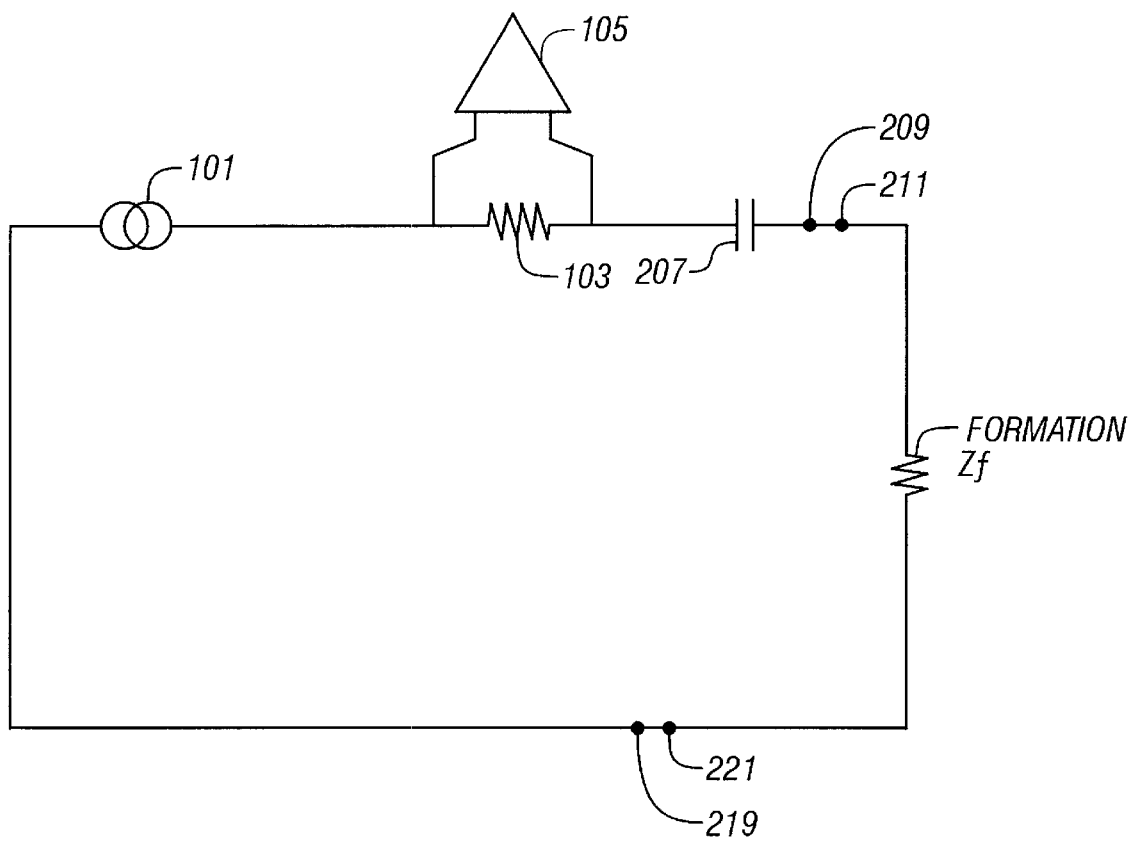
FIG. 5 is a schematic circuit diagram of the tool when used with a conducting borehole fluid.

Alternatively, other configurations of the electrodes on a measuring pad may also be used. FIG. 5 shows an arrangement in which five circular measure electrodes 303a, 303b . . . 303e are located on a pad 301. Each measure electrode is surrounded by an associated focusing electrode 305a, 305b . . . 305e with insulation 307a, 307b . . . 307e therebetween. For simplifying the illustration, the insulation between the guard electrodes and the pad 301 is not shown.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing. These embodiments are discussed next.

Figure 7:
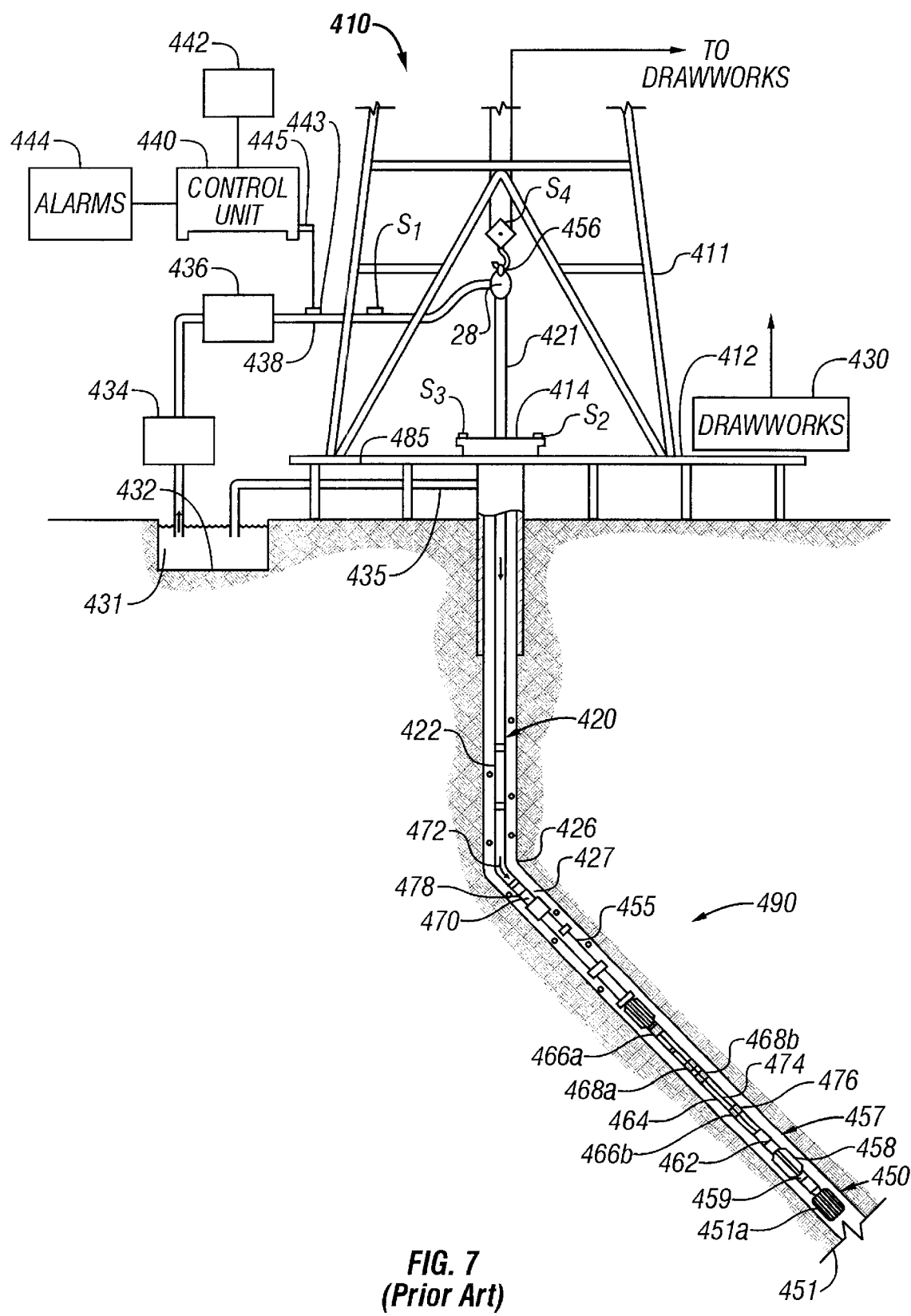
FIG. 7 (Prior art) is a schematic illustration of a drilling system.

FIG. 7 shows a schematic diagram of a drilling system 410 having a drilling assembly 490 shown conveyed in a borehole 426 for drilling the wellbore. The drilling system 410 includes a conventional derrick 411 erected on a floor 412 which supports a rotary table 414 that is rotated by a prime mover such as an electric motor (not shown) at a desired rotational speed. The drill string 420 includes a drill pipe 422 extending downward from the rotary table 414 into the borehole 426. The drill bit 450 attached to the end of the drill string breaks up the geological formations when it is rotated to drill the borehole 426. The drill string 420 is coupled to a drawworks 430 via a Kelly joint 421, swivel, 428 and line 429 through a pulley 423. During drilling operations, the drawworks 430 is operated to control the weight on bit, which is an important parameter that affects the rate of penetration. The operation of the drawworks is well known in the art and is thus not described in detail herein.

During drilling operations, a suitable drilling fluid 431 from a mud pit (source) 432 is circulated under pressure through the drill string by a mud pump 434. The drilling fluid passes from the mud pump 434 into the drill string 420 via a desurger 436, fluid line 328 and Kelly joint 421. The drilling fluid 431 is discharged at the borehole bottom 451 through an opening in the drill bit 450. The drilling fluid 431 circulates uphole through the annular space 427 between the drill string 420 and the borehole 426 and returns to the mud pit 432 via a return line 435. A sensor $S_1$ preferably placed in the line 438 provides information about the fluid flow rate. A surface torque sensor $S_2$ and a sensor $S_3$ associated with the drill string 420 respectively provide information about the torque and rotational speed of the drill string. Additionally, a sensor (not shown) associated with line 429 is used to provide the hook load of the drill string 420.

In one embodiment of the invention, the drill bit 450 is rotated by only rotating the drill pipe 452. In another embodiment of the invention, a downhole motor 455 (mud motor) is disposed in the drilling assembly 490 to rotate the drill bit 450 and the drill pipe 422 is rotated usually to supplement the rotational power, if required, and to effect changes in the drilling direction.

In the embodiment of FIG. 7, the mud motor 455 is coupled to the drill bit 450 via a drive shaft (not shown) disposed in a bearing assembly 457. The mud motor rotates the drill bit 450 when the drilling fluid 431 passes through the mud motor 455 under pressure. The bearing assembly 457 supports the radial and axial forces of the drill bit. A stabilizer 458 coupled to the bearing assembly 457 acts as a centralizer for the lowermost portion of the mud motor assembly.

In one embodiment of the invention, a drilling sensor module 459 is placed near the drill bit 450. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. The drilling sensor module processes the sensor information and transmits it to the surface control unit 440 via a suitable telemetry system 472.

Figure 8:
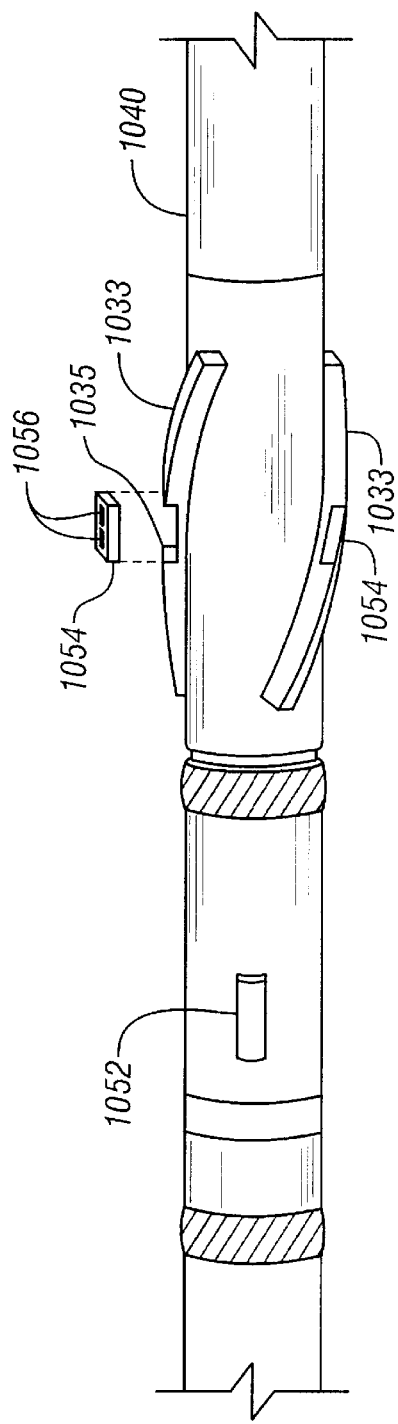
FIG. 8 is a schematic illustration of the invention in which resistivity measurements are made at various azimuths

FIG. 8 shows an embodiment of the invention in which sensors mounted on stabilizers of a drilling assembly are used to determine the resistivity of the formation. One or more of the stabilizers 1033 is provided with a recess 1035 into which a sensor module 1054 is set. Each sensor module 1054 has one or more measure electrodes 1056 for injecting measure currents into the formation as described above. As discussed above, the body of the sensor module is maintained at approximately the same potential as the measure electrode to operate as a guard electrode. Optionally, focusing electrodes may be provided as discussed above.

In a measurements while drilling environment, there is usually a small gap between the stabilizer and the borehole wall (not shown): the diameter of the drill bit (not shown) conveyed on the drilling tubular 1040 is greater than the outer diameter as defined by the stabilizers. The operation of the stabilizers would be known to those versed in the art and is not described further here. When used with a nonconducting fluid in the borehole, the gap defines the capacitance 107 discussed above. If necessary, extendable arms (not shown) may be provided to keep the gap within acceptable limits. When used with a conducting borehole fluid, the size of the gap is not critical. An electronics module 1052 at a suitable location is provided for processing the data acquired by the sensors 1056.

Figure 9:
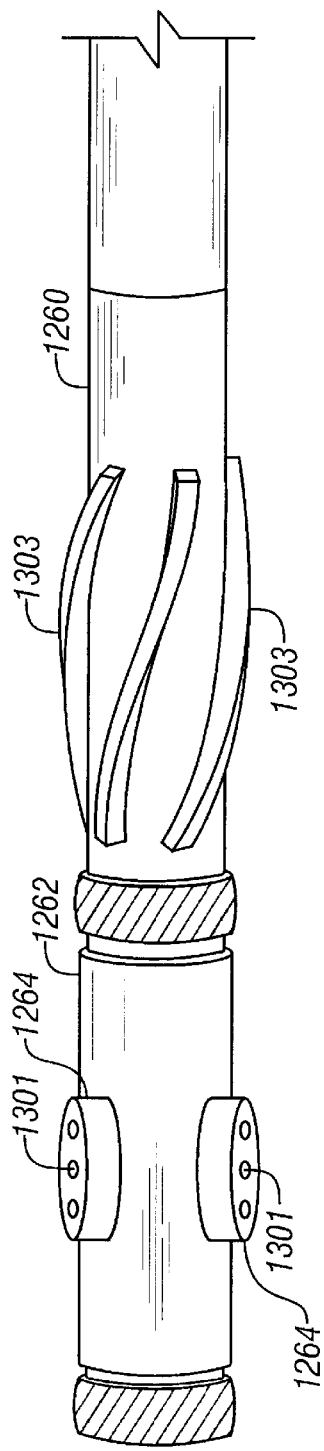
FIG. 9 illustrates the pads on a non-rotating sleeve used for resistivity measurements.

FIG. 9 illustrates the arrangement of the sensor pads on a non-rotating sleeve. This is similar to an arrangement of sensors taught by Thompson though other configurations could also be used. Shown are the drilling tubular 1260 with a non-rotating sleeve 1262 mounted thereon. Pads 1264 with one or more measure electrodes 1301 are attached to sleeve 1262. The mechanism for moving the pads out to contact the borehole, whether it be hydraulic, a spring mechanism or another mechanism is not shown. The shaft 1260 is provided with stabilizer ribs 1303 for controlling the direction of drilling.

Data may be acquired using the configuration of either FIG. 8 or FIG. 9 while the well is being drilled and the drillstring and the measure electrodes thereon are rotating. In a MWD environment, telemetry capability is extremely limited and accordingly, much of the processing is done downhole. Processing of the data in the present invention is accomplished using the methodology taught in Thompson et al. The resistivity measurements are made concurrently with measurements made by an orientation sensor (not shown) on the drilling assembly. As the resistivity sensor rotates in the borehole while it is moved along with the drill bit, it traces out a spiral path with known depths and azimuths. The depths are determined either from data telemetered from the surface or by using at least two axially space apart measure electrodes to give a rate of penetration. In one embodiment of the invention, the downhole processor uses the depth information from downhole telemetry and sums all the data within a specified depth and azimuth sampling interval to improve the S/N ratio and to reduce the amount of data to be stored. A typical depth sampling interval would be one inch and a typical azimuthal sampling interval is 15°. Another method of reducing the amount of data stored would be to discard redundant samples within the depth and azimuth sampling interval. Further details of the processing method may be found in the teachings of Thompson et al.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A Measurement-while-drilling (MWD) apparatus in a bottom hole assembly (BHA) for use in a borehole for obtaining a resistivity parameter of an earth formation penetrated by the borehole, the borehole having a substantially nonconducting fluid therein, the apparatus comprising:

(a) at least one measure electrode carried on and rotating with a drilling tubular, said at least one measure electrode capacitively coupled to the earth formation through said nonconducting fluid, said at least one measure electrode conveying a measure current into the formation; and (b) a device responsive to least one of (i) the current in the at least one measure electrode, and, (ii) a voltage of the at least one measure electrode for producing a measure signal representative of the resistivity parameter.

2. The MWD apparatus of claim 1 wherein the at least one measure electrode is carried on the body of a sensor module deployed in a recess on a stabilizer of the BHA.

3. The MWD apparatus of claim 2 wherein the at least one measure electrode comprises at least two measure electrodes spaced apart in an axial direction of the BHA.

4. The MWD apparatus of claim 2 wherein the at least one measure electrode is electrically isolated from said body of the sensor module and wherein said body is maintained at substantially the same potential as the at least one measure electrode.

5. The MWD apparatus of claim 1 further comprising an extension device for moving the at least one measure electrode to maintain a specified distance between the at least one measure electrode and a wall of the borehole.

6. The MWD apparatus of claim 1 further comprising:
   (i) a telemetry device for receiving depth information from an uphole controller,
   (ii) a directional sensor for making measurements related to the orientation of the at least one measure electrode,
   (iii) a processor for determining the resistivity parameter from the measurements made by the directional sensor, the depth information, and said measure signal.

7. The MWD apparatus of claim 1 wherein said measure current is a modulated current, the apparatus further comprising a source of a modulated electrical current coupled to said at least one measure electrode.

8. The MWD apparatus of claim 7 wherein the modulated electrical current has a carrier frequency and a modulating frequency substantially less than said carrier frequency.

9. The MWD apparatus of claim 7 further comprising an isolator section between the current source and the at least one measure electrode, said isolator section including conductors carrying said modulated current to the measure electrode and said demodulated measure signal from the at least one measure electrode.

10. A method of obtaining a resistivity parameter of an earth formation penetrated by a borehole having a substantially nonconducting fluid therein, the method comprising:
    (a) conveying at least one measure electrode on a rotating member of a measurement while drilling (MWD) apparatus into a borehole;
    (b) capacitively coupling the at least one measure electrode to the earth formation through the nonconducting fluid and conveying a measure current into the earth formation; and
    (b) determining at least one of (i) the current at the at least one measure electrode, and, (ii) a voltage of the at least one measure electrode for producing a measure signal representative of the resistivity parameter.

11. The method of claim 10 further comprising using a selected guard potential for maintaining focusing of said measure current in the formation.

12. The method of claim 10 further comprising maintaining a specified distance between the at least one measure electrode and a wall of the borehole.

13. The method of claim 10 further comprising:
    (i) receiving depth information from an uphole location,
    (ii) making orientation measurements related to the orientation of the at least one measure electrode, and
    (iii) determining the resistivity parameter from the orientation measurements, the depth information, and said measure signal.

14. The method of claim 10 further comprising modulating said measure current.

15. The method of claim 10 wherein the modulated electrical current has a carrier frequency and a modulating frequency substantially less than said carrier frequency.

16. The method of claim 15 further comprising isolating said at least one measure electrode from a source of said modulated current.

17. The method of claim 10 wherein the modulated electrical current has a carrier frequency and a modulating frequency substantially less than said carrier frequency.

18. The method of claim 14 further comprising isolating said measure electrode from a source of said modulated current.

* * * * *